United States Patent
Iwami et al.

(10) Patent No.: US 8,320,270 B2
(45) Date of Patent: Nov. 27, 2012

(54) WIRELESS APPARATUS FOR MEASURING A RECEIVED WIRELESS SIGNAL AND MEASUREMENT SYSTEM USING THE WIRELESS APPARATUS

(75) Inventors: Masashi Iwami, Gifu (JP); Takashi Ozeki, Gifu (JP)

(73) Assignee: Kyocera Corporation, Kyoto (JP)

( * ) Notice: Subject to any disclaimer, the term of this patent is extended or adjusted under 35 U.S.C. 154(b) by 301 days.

(21) Appl. No.: 12/664,047

(22) PCT Filed: Jun. 10, 2008

(86) PCT No.: PCT/JP2008/001480
§ 371 (c)(1),
(2), (4) Date: Mar. 8, 2010

(87) PCT Pub. No.: WO2008/152800
PCT Pub. Date: Dec. 18, 2008

(65) Prior Publication Data
US 2010/0182922 A1    Jul. 22, 2010

(30) Foreign Application Priority Data
Jun. 13, 2007   (JP) ................. 2007-156519

(51) Int. Cl.
*H04J 3/06* (2006.01)
*H04H 20/67* (2008.01)

(52) U.S. Cl. ..... 370/252; 370/339; 370/350; 455/452.2; 455/63.4

(58) Field of Classification Search ............. 370/252, 370/329, 339, 350, 503; 455/450–452.2, 455/63.4, 428
See application file for complete search history.

(56) References Cited

U.S. PATENT DOCUMENTS

| | | | | |
|---|---|---|---|---|
| 5,107,273 | A  * | 4/1992  | Roberts ..................... | 342/417 |
| 7,312,750 | B2 * | 12/2007 | Mao et al. .................. | 342/377 |
| 2009/0137221 | A1 * | 5/2009  | Nanda et al. .............. | 455/296 |
| 2009/0310586 | A1 * | 12/2009 | Shatti ........................ | 370/338 |
| 2009/0323836 | A1 * | 12/2009 | Nakano et al. ............ | 375/260 |
| 2010/0298015 | A1 * | 11/2010 | Medbo et al. ............. | 455/501 |

FOREIGN PATENT DOCUMENTS

| | | |
|---|---|---|
| JP | 2000-295152 | 10/2000 |
| JP | 2001-007754 | 1/2001 |
| JP | 2001-352282 | 12/2001 |
| JP | 2003-092548 | 3/2003 |

OTHER PUBLICATIONS

International Search Report for PCT/JP2008/001480, mailed on Aug. 26, 2008, 1 page. International Preliminary Report on Patentability for PCT/JP2008/001480, issued Dec. 17, 2009, 4 pages.
Notification of Reason(s) for Refusal (translation) for JP 2009-519158, mailed Apr. 17, 2012, 2 pages.
JP Office Action and English Translation for JP Patent Application No. 2009-519158, mailed July 10, 2012, 4 pages.

* cited by examiner

*Primary Examiner* — Kerri Rose
(74) *Attorney, Agent, or Firm* — Duane Morris LLP; Richard C. Kim

(57) ABSTRACT

A base station apparatus switches between a communication mode for performing communication with a communication party and a calibration mode for performing a calibration process. In the calibration mode, a weight vector in accordance with a first algorithm for performing a null steering directivity control for orienting an area of drastically-lowered antenna gain in the direction of arrival of a reception signal. Furthermore, multiple transmission signals weighted by the acquired weight vector are output, and a correction value for readjusting the result of the null steering directivity control is acquired from a control PC. In the communication mode, multiple transmission signals are corrected by using the correction value acquired in a calibration mode, and the corrected signals are output.

2 Claims, 4 Drawing Sheets

WIRELESS APPARATUS FOR MEASURING A RECEIVED WIRELESS SIGNAL AND MEASUREMENT SYSTEM USING THE WIRELESS APPARATUS

CROSS-REFERENCE TO RELATED APPLICATIONS

This is a US National Phase Application of International Application No. PCT/JP2008/001480 filed Jun. 10, 2008, which claims priority to Japanese Patent Application No. 2007-156519 filed Jun. 13, 2007, the disclosures of which are incorporated herein by reference in their entirety.

TECHNICAL FIELD

The present invention relates to a wireless communication technique and particularly to a wireless apparatus for measuring a received wireless signal and a measurement system using the wireless apparatus.

BACKGROUND ART

Recently, with a growing number of mobile stations such as mobile phones and WLANs (Wireless Local Area Networks), there are growing social demands for the effective utilization of frequency resources. Spatial multiplexing scheme is one of the communication schemes that meet these demands. Spatial multiplexing scheme is a scheme of communicating transmission and reception signals of multiple mobile stations in a multiplexing manner at the same frequency and at the same time by forming directivity patterns that are different for each of the mobile stations by using an adaptive array antenna apparatus.

An adaptive array antenna apparatus is provided with multiple wireless units, each comprising an antenna, a transmission unit, and a reception unit, and forms directivity patterns as a whole by adjusting the amplitudes and phases of reception signals and transmission signals input into or output from the wireless units. Directivity patterns are formed by weighting reception signals and transmission signals input into or output from the wireless units by weight vectors for adjusting the amplitudes and phases.

However, regarding an LNA (Low Noise Amplifier) in the reception unit, an HPA (High Power Amplifier) in the transmission unit, etc., the transmission unit and the reception unit can have different characteristics of transmission among antennas such as the amount of phase rotation or the amount of amplitude fluctuation of a signal due to the individual difference or the temperature change under the environment of usage. Such differences in the transmission characteristics between the reception unit and the transmission unit affect the formation of a directivity pattern during reception and transmission.

For this reason, a calibration process needs to be performed for obtaining the difference in transmission characteristics between the transmission unit and the reception unit and compensating for the difference in transmission characteristics. In the related art, a desired signal and an interference signal are separately transmitted from two signal sources and superimposed by a synthesizer. A calibration process is then performed based on the superimposed signal in a wireless apparatus (e.g., patent document 1). [Patent document 1] JP 2001-352282

DISCLOSURE OF THE INVENTION

Technical Problem

However, a noise can be produced during the superimposition of signals from two signal sources by a synthesizer. In this case, the measurement accuracy of a wireless apparatus is impaired, adversely affecting the calibration process.

In this background, a purpose of the present invention is to provide a technique for improving the accuracy of a calibration process.

Means For Solving the Problem

A wireless apparatus according to one embodiment of the present invention comprises: a mode selection unit operative to select a communication mode for performing communication with a wireless apparatus to be communicated or a calibration mode for a calibration process; a weight vector acquisition unit operative to acquire a weight vector by executing a first algorithm, which is for a null steering directivity control, on a plurality of reception signals when the calibration mode is being selected by the mode selection unit and to acquire a weight vector by executing a second algorithm different from the first algorithm when the communication mode is being selected by the mode selection unit; an output unit operative to output a plurality of transmission signals weighted by the weight vector acquired by the weight vector acquisition unit; and a correction value acquisition unit operative to acquire a correction value for readjusting the result of the null steering directivity control after the transmission signals are output by the output unit when the calibration mode is being selected by the mode selection unit. The output unit outputs a plurality of transmission signals after correcting the transmission signals by using the correction value acquired by the correction value acquisition unit when the communication mode is being selected by the mode selection unit.

Another embodiment of the present invention relates to a measurement system. The measurement system comprises: a signal generation apparatus operative to generate a plurality of signals for performing a calibration process; a wireless apparatus operative to receive the plurality of signals generated by the signal generation apparatus and output transmission signals by performing the calibration process based on the received signals; a measurement apparatus operative to measure the transmission signals output from the wireless apparatus; and a control apparatus operative to control the wireless apparatus based on the result of the measurement apparatus, wherein the wireless apparatus comprises: a mode selection unit operative to select a communication mode for performing communication with a wireless apparatus to be communicated or a calibration mode for a calibration process; a weight vector acquisition unit operative to acquire a weight vector by executing a first algorithm, which is for a null steering directivity control, on a plurality of reception signals received from the signal generation apparatus when the calibration mode is being selected by the mode selection unit and to acquire a weight vector by executing a second algorithm different from the first algorithm when the communication mode is being selected by the mode selection unit; an output unit operative to output a plurality of transmission signals weighted by the weight vector acquired by the weight vector acquisition unit; and a correction value acquisition unit operative to acquire, from the control apparatus, a correction value for readjusting the result of the null steering directivity control after the transmission signals are output by the output unit when the calibration mode is being selected by the mode selection unit. The output unit outputs a plurality of transmission signals after correcting the transmission signals by using the correction value acquired by the correction value acquisition unit when the communication mode is being selected by the mode selection unit.

Optional combinations of the aforementioned constituting elements, and implementations of the invention in the form of methods, apparatuses, systems, recording mediums, and computer programs may also be practiced as additional modes of the present invention.

Advantageous Effects

According to the present invention, the accuracy of a calibration process can be improved.

Figure 1:
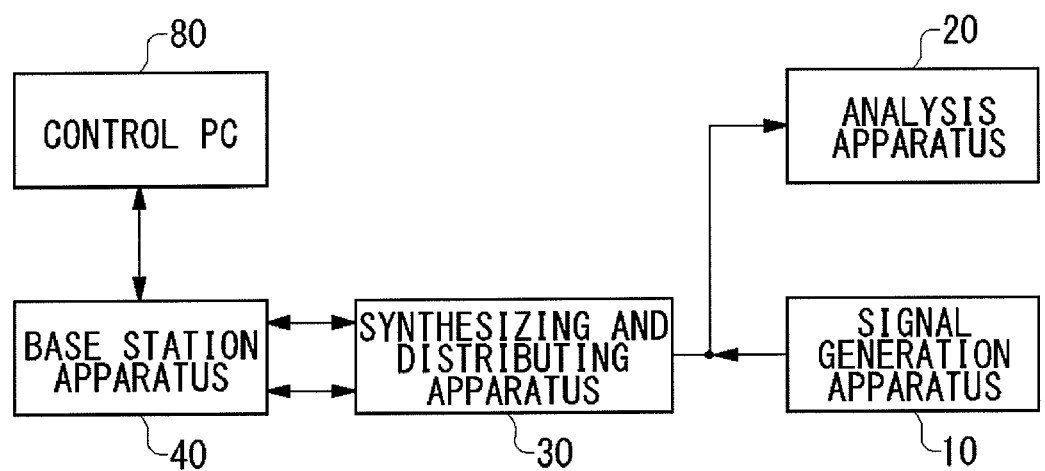
FIG. 1 is a diagram illustrating a configuration example of a measurement system according to an embodiment of the present invention.

EXPLANATION OF REFERENCE 10. signal generation apparatus
20. analysis apparatus
30. synthesizing and distributing apparatus
40. base station apparatus
42. antenna
44. transmission and reception switch
46. reception weight vector calculation unit
48. multiplication unit
50. addition unit
52. baseband processing unit
54. transmission weight vector setting unit
60. control unit
64. correction value acquisition unit
66. reception RF unit
68. transmission RF unit
70. first selection unit
72. null steering control execution unit
74. MMSE execution unit
76. second selection unit
80. control PC
100. measurement system
200. control example
210. first directivity characteristics
220. direction of arrival
240. null point
250. arrow
260. second directivity characteristics
300. flowchart

BEST MODE FOR CARRYING OUT THE INVENTION

A brief description is now given of an embodiment of the present invention before focusing on specific features of the embodiment of the present invention. The embodiment of the present invention relates to a measurement system for a calibration process. The measurement system includes a wireless apparatus provided with an adaptive array antenna. The wireless apparatus calculates a weight vector based on a signal from a signal source and performs the calibration process.

In a conventional measurement system, two signals, a desired signal and an interference signal, are generated from different signal sources and superimposed by a synthesizer, and a superimposed signal is input in a wireless apparatus, followed by the calculation of a weight vector by using MMSE (Minimum Mean Square Error), etc., in the wireless apparatus. However, noise can also be superimposed during the synthesis. This affects the calculation accuracy of a weight vector in the wireless apparatus. Also, the number of environmental parameters for the measurement becomes large since two signal sources are required. This increases the number of elements for adjustment, leading to an increase in cost.

Therefore, in the embodiment of the present invention, a signal from one signal source is distributed so as to generate multiple signals, and a weight vector is controlled so that a null is oriented in the direction of arrival of the signals. With this, the measurement accuracy of a calibration process can be improved.

FIG. 1 is a diagram illustrating a configuration example of a measurement system 100 according to an embodiment of the present invention. The measurement system 100 includes a signal generation apparatus 10, an analysis apparatus 20, a synthesizing and distributing apparatus 30, a base station apparatus 40, and a control PC 80.

The signal generation apparatus 10 generates a signal for the base station apparatus 40 to perform a calibration process and transmits the generated signal to the base station apparatus 40 via the synthesizing and distributing apparatus 30. The synthesizing and distributing apparatus 30 distributes the signal transmitted form the signal generation apparatus 10 into multiple signals and inputs the signals into the base station apparatus 40. The synthesizing and distributing apparatus 30 synthesizes transmission signals output from the base station apparatus 40 and transmits the signals to the analysis apparatus 20. Details of the analysis apparatus 20 will be described later.

The base station apparatus 40 enters into either a communication mode for performing communication with a communication party or a calibration mode for performing a calibration process. The calibration mode is activated in the embodiment of the measurement system 100.

When the calibration mode is activated, the base station apparatus 40 performs a null steering directivity control, which is for orienting an area of drastically-lowered antenna gain (hereinafter, referred to as a "null") in the direction of arrival of a reception signal, on the multiple signals generated by the signal generation apparatus 10 and outputs a transmission signal. A null steering directivity control is realized, for example, by controlling a weight vector so that a null point having antenna directivity is oriented in the direction of a signal source as disclosed in Laid-Open Publication No. 2000-82987.

The base station apparatus 40 outputs a transmission signal multiplied by an adjusted weight vector. The transmission signal is received by the analysis apparatus 20 via the synthesizing and distributing apparatus 30. The analysis apparatus 20 analyzes the received signal and measures a reception level of each phase. The transmission signal from the base station apparatus 40 is weighted by a null steering directivity control so that a null is observed in the direction of arrival. In theory, the reception level of a phase that corresponds to a direction of arrival should thus be smaller than the reception levels of other phases. However, a null point can be off-oriented from the direction of arrival due to the difference in the characteristics between the reception unit and the transmission unit. Thus, a phase needs to be rotated so as to take control so that a null point is oriented in the direction of arrival in this situation. In other words, a calibration process is necessary for readjusting the result of the null steering directivity control.

Figure 2:
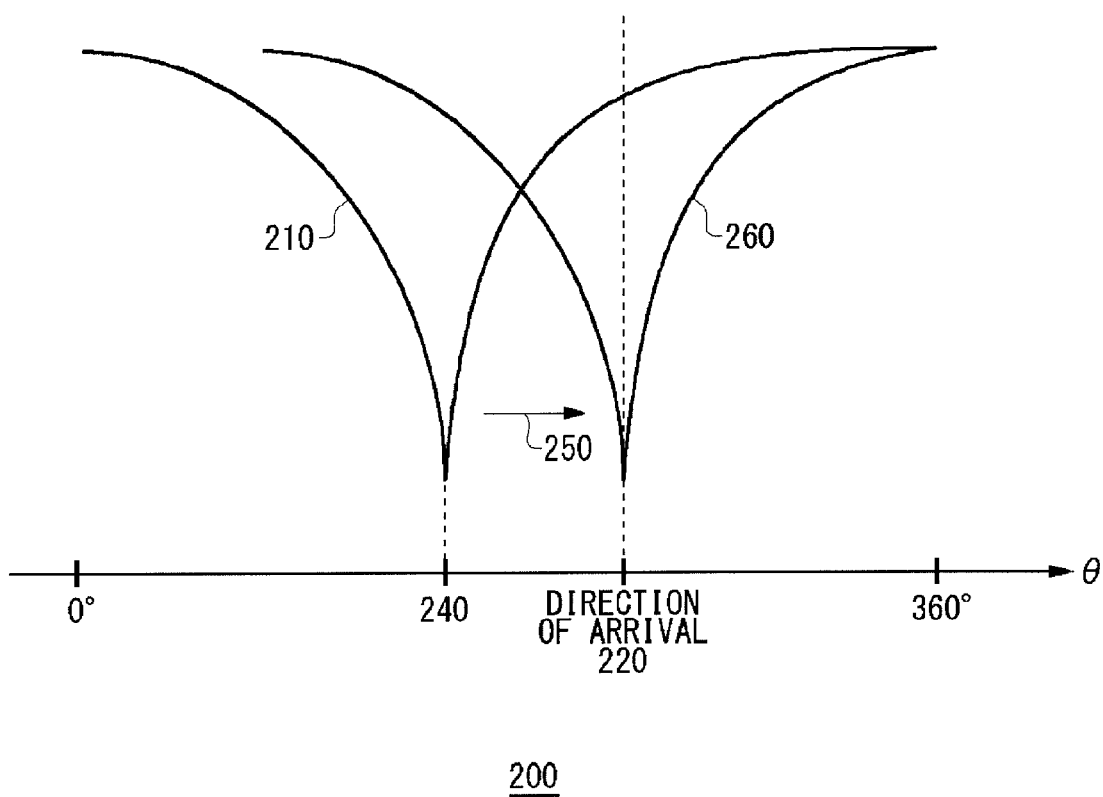
FIG. 2 is a diagram illustrating a control example of a null steering directivity control in the measurement system shown in FIG. 1.

A detailed description is now given. FIG. 2 is a diagram illustrating a control example 200 of a null steering directivity control in a measurement system 100 shown in FIG. 1. The horizontal axis represents the phase, and the vertical axis represents the reception level. A first directivity characteristic 210 is a directivity characteristic measured by an analysis apparatus 20. A second directivity characteristic 260 is a desired directivity characteristic. As shown in the figure, the phase corresponding to the null point of the second directivity characteristic 260 coincides with the phase corresponding to the direction of arrival. In the control example 200, the aim is to obtain the second directivity characteristic 260 by readjusting the null steering directivity control when the first directivity characteristic 210 is obtained.

With regard to the first directivity characteristic 210, a direction of arrival 220 and a null point 240 are out of alignment with each other. In this situation, the first directivity characteristic 210 needs to be moved to the second directivity characteristic 260, as shown by an arrow 250, by adjusting the phase of the transmission power output by the base station apparatus 40 so that the null point 240 at which a reception level is at minimum in the first directivity characteristic 210 overlaps the direction of arrival 220. More specifically, a correction value of a phase input into the base station apparatus 40 from the control PC 80 is adjusted. The adjustment needs to be repeated until the second directivity characteristic 260 is obtained by, for example, changing degree by degree the correction value of a phase input into the base station apparatus 40. The correction value is for an I signal and a Q signal and may include information indicating amplitude in addition to a phase.

FIG. 1 is referred back. In the calibration process in the measurement system 100, the analysis apparatus 20 displays the measurement result of a reception level of each phase. Upon the receipt of the measurement result, a user operates the control PC 80 and inputs a correction value of a phase for readjusting the result of a null steering directivity control into the base station apparatus 40. The base station apparatus 40 performs a calibration process by using the acquired correction value and outputs a transmission signal to the analysis apparatus 20. The base station apparatus 40 repeats these processes until the null point is oriented in the direction of arrival. The base station apparatus 40 stores a correction value at which the null point is oriented in the direction of arrival after the calibration process.

The base station apparatus 40 acquires a weight vector in accordance with an algorithm for other than a null steering directivity control, for example, an MMSE method when in a communication mode. The base station apparatus 40 corrects multiple transmission signals by using the correction value acquired in a calibration mode and outputs the corrected signals.

Figure 3:
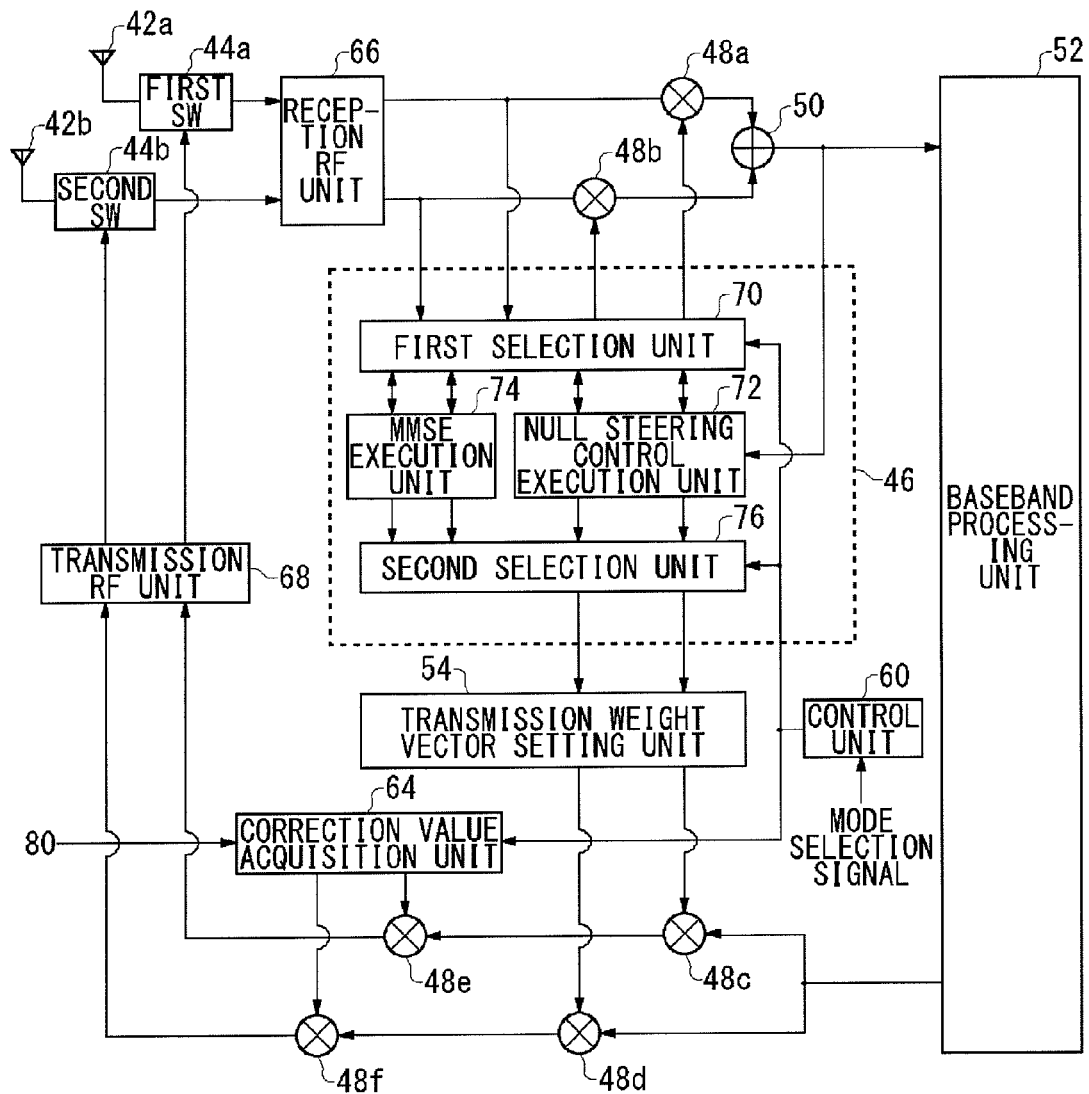
FIG. 3 is a diagram illustrating a configuration example of the base station apparatus shown in FIG. 1.

FIG. 3 is a diagram illustrating a configuration example of the base station apparatus 40 shown in FIG. 1. The base station apparatus 40 includes: a first antenna 42a and a second antenna 42b, which are represented by an antenna 42; a first transmission and reception switch 44a and a second transmission and reception switch 44b, which are represented by a transmission and reception switch 44; a reception weight vector calculation unit 46 indicated by a dashed line; a first multiplication unit 48a through a sixth multiplication unit 48f, which are represented by a multiplication unit 48; an addition unit 50; a baseband processing unit 52; a transmission weight vector setting unit 54; a control unit 60; a correction value acquisition unit 64; a reception RF unit 66; and a transmission RF unit 68.

The control unit 60 takes control of switching between a communication mode for performing communication with a communication party and a calibration mode for a calibration process. More specifically, the control unit 60 switches a mode by indicating either of the modes to the reception weight vector calculation unit 46 and the correction value acquisition unit 64 in accordance with a mode selection signal received via an input and output interface (not shown). For the sake of ease of explanation, the explanation is first given of the operation during the calibration mode and then given of the operation during the communication mode in the following.

(1) In the Calibration Mode

The antenna 42 is not used in the calibration mode, and a signal from a synthesizing and distributing apparatus 30 is input to an input and output terminal (not shown) and delivered to the transmission and reception switch 44. The transmission and reception switch 44 outputs a reception signal to the reception RF unit 66. The reception RF unit 66 includes an LNA, a mixer, or a quadrature detector (not shown) and demodulates the reception signal into a baseband signal. The transmission and reception switch 44 outputs from the input and output terminal a transmission signal output from the transmission RF unit 68 that will be described hereinafter.

The reception weight vector calculation unit 46 includes a first selection unit 70, a null steering control execution unit 72, an MMSE execution unit 74, and a second selection unit 76. In accordance with the instruction by the control unit 60, the first selection unit 70 selectively outputs a signal output from the reception RF unit 66 to the null steering control execution unit 72 or the MMSE execution unit 74. When the instruction is received from the control unit 60 indicating the calibration mode, a signal output from the reception RF unit 66 is output to the null steering control execution unit 72.

The null steering control execution unit 72 acquires a reception weight vector by performing a null steering directivity control, which is for orienting an area of drastically-lowered antenna gain in the direction of arrival of a reception signal, on the multiple reception signals output from the first selection unit 70. More specifically, the null steering control execution unit 72 estimates the direction of arrival of the reception signal by using a latter signal of the addition unit 50, the first multiplication unit 48a, and the second multiplication unit 48b and computes a reception weight vector such that a null point is oriented in the direction of arrival.

The null steering control execution unit 72 outputs the acquired reception weight vector to the first selection unit 70 and the second selection unit 76. In accordance with the instruction by the control unit 60, the second selection unit 76 selects the reception weight vector output from the null steering control execution unit 72 or the MMSE execution unit 74 and outputs the reception weight vector to the third multiplication unit 48c and the fourth multiplication unit 48d. When the instruction indicating a calibration mode is received from the control unit 60, the reception weight vector output from the null steering control execution unit 72 is output to the transmission weight vector setting unit 54.

In the calibration mode, the first selection unit 70 outputs a reception weight vector output from the null steering control execution unit 72 to the first multiplication unit 48a and the second multiplication unit 48b. The first multiplication unit 48a and the second multiplication unit 48b superimpose the reception weight vector acquired by the reception weight vector calculation unit 46 on the reception signal delivered from the reception RF unit 66. The addition unit 50 synthesizes signals respectively output from the first multiplication unit 48a and the second multiplication unit 48b and outputs the synthesized signal to the baseband processing unit 52. The baseband processing unit 52 performs a demodulation process or the like on the synthesized reception signal. The baseband processing unit 52 performs a modulation process or the like on a signal to be transmitted and outputs the signal to the third multiplication unit 48c and the fourth multiplication unit 48d.

The transmission weight vector setting unit 54 sets the reception weight vector output via the second selection unit 76 as a transmission weight vector and then outputs the transmission weight vector to the third multiplication unit 48c and the fourth multiplication unit 48d. The third multiplication unit 48c and the fourth multiplication unit 48d superimpose the reception weight vector delivered from the transmission weight vector setting unit 54 on the transmission signal output from the baseband processing unit 52.

The correction value acquisition unit 64 acquires a correction value from the control PC 80 and stores the correction value. The fifth multiplication unit 48e and the sixth multiplication unit 48f superimpose the correction value stored in the correction value acquisition unit 64 onto the transmission signal output from the third multiplication unit 48c and the fourth multiplication unit 48d and output the superimposed signal to the transmission RF unit 68. The transmission RF unit 68 includes a quadrature modulator, a mixer, or a PA (not shown), performs a modulation process on the signal output from the fifth multiplication unit 48e and the sixth multiplication unit 48f, and outputs the signal to the transmission and reception switch 44.

(2) In the Communication Mode

The communication mode is now described in detail. During this mode, the embodiment indicated by the measurement system 100 is not employed; however, the embodiment where the base station apparatus 40, the signal generation apparatus 10, the analysis apparatus 20, and the control PC 80 are not connected is employed, and the base station apparatus 40 operates alone. An explanation is omitted for the same process as that described for the calibration mode.

When the instruction indicating the communication mode is received from the control unit 60, the first selection unit 70 outputs a signal output from the reception RF unit 66 to the MMSE execution unit 74. The MMSE execution unit 74 calculates a reception weight vector by an MMSE method and outputs the reception weight vector to the first multiplication unit 48a and the second multiplication unit 48b via the first selection unit 70. The reception weight vector calculation unit 46 outputs the calculated reception weight vector to the transmission weight vector setting unit 54 via the second selection unit 76. The transmission weight vector setting unit 54 sets the reception weight vector calculated by the reception weight vector calculation unit 46 as a transmission weight vector.

In accordance with the instruction by the control unit 60, the correction value acquisition unit 64 retrieves the correction value stored upon the completion of the calibration process and outputs the correction value to the fifth multiplication unit 48e and the sixth multiplication unit 48f. Regarding a transmission signal, the directivity characteristic is adjusted by superimposing the transmission signal onto the transmission weight vector by the third multiplication unit 48c and the fourth multiplication unit 48d. Furthermore, the directivity characteristic is readjusted by the superimposition of the correction value by the fifth multiplication unit 48e and the sixth multiplication unit 48f.

These configurations described above are implemented in hardware by any CPU of a computer, memory or other LSI's, and in software by a program or the like loaded into the memory. Functional blocks implemented by the cooperation of hardware and software are depicted. Thus, a person skilled in the art should appreciate that there are many ways of accomplishing these functional blocks in various forms in accordance with the components of hardware only, software only, or the combination of both.

Figure 4:
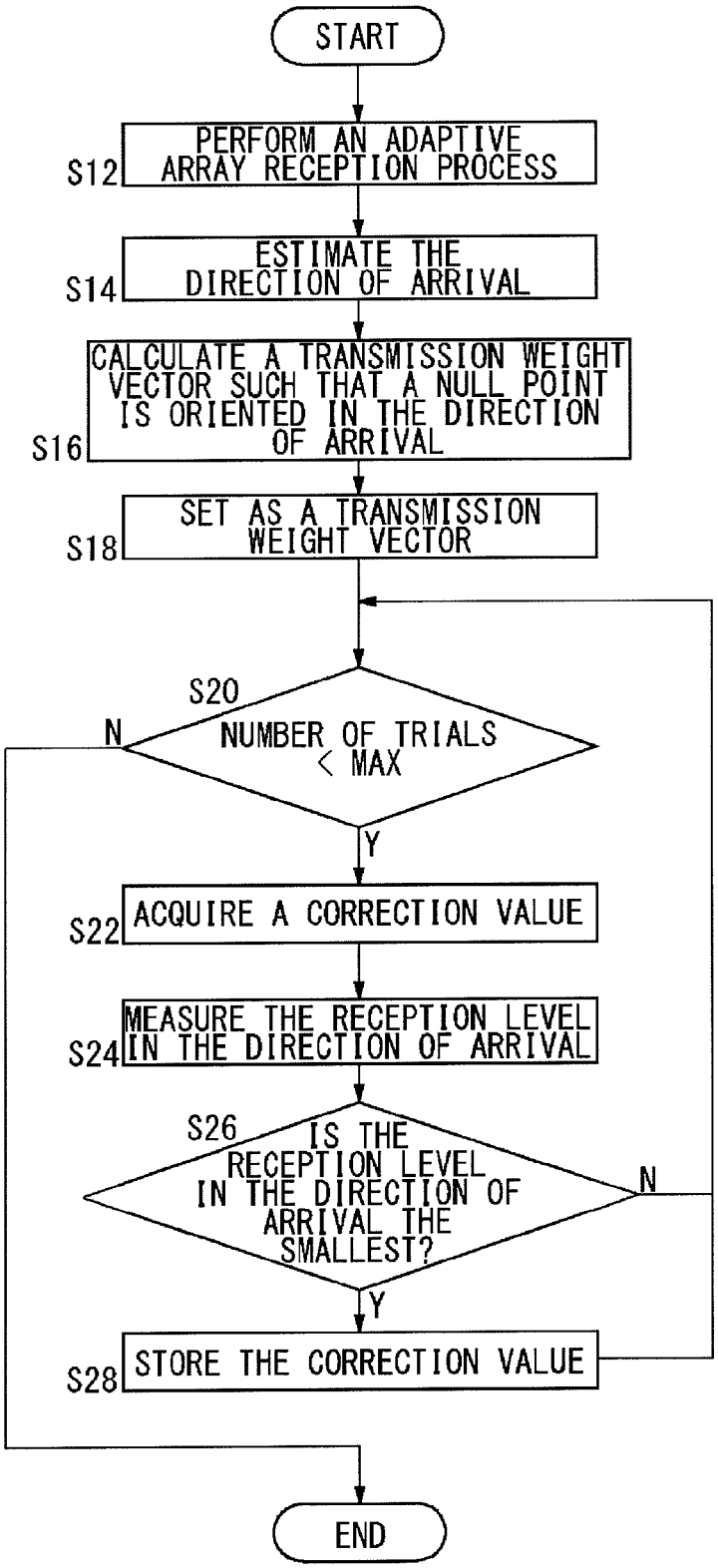
FIG. 4 is a flowchart showing an operation example of a calibration process in the measurement system shown in FIG. 1.

FIG. 4 is a flowchart 300 showing a procedural example of a calibration process in the measurement system 100 shown in FIG. 1. In the flowchart 300, it is assumed that the base station apparatus 40 is set to a calibration mode.

First, the base station apparatus 40 performs an adaptive array reception process on multiple signals output from the signal generation apparatus 10 via the synthesizing and distributing apparatus 30 (S12). The base station apparatus 40 then estimates the direction of arrival of the received signal (S14). The base station apparatus 40 calculates (S16) and sets (S18) a weight vector such that a null point is oriented in the estimated direction of arrival.

The base station apparatus 40 compares a previously-set maximum number of repetitions MAX with the number of trials (S20). The number of trials is cleared to "0" every time the flowchart 300 is started. When the number of trials is smaller than MAX (Y in S20), the base station apparatus 40 acquires a correction value from the control PC 80 (S22) and outputs a transmission signal after multiplying the signal by the correction value. The analysis apparatus 20 measures the reception level in the estimated direction of arrival in the process of S14 based on the signal output from the base station apparatus 40 (S24).

When the reception level in the direction of arrival is the smallest compared to the reception levels measured in the past (Y in S26), the base station apparatus 40 stores the correction value by order of the control PC 80 (S28) and goes back to the process in S20. On the other hand, when the reception level is not the smallest (N in S26), the flow is directed back to the process in S20. The number "1" is added to the number of trials when the flow is directed back to the process in S20. Hereinafter, the processes in S22-S28 are repeated in S20 until the number of trials becomes at least MAX. When the number of trials reaches at least MAX (N in S20), the processes in the flowchart 300 are terminated.

As described above, controlling a weight vector so that a null is oriented in the direction of arrival of a given signal allows a calibration process to be performed with only one signal source. Therefore, a measurement system can be simplified. The measurement accuracy of a calibration process can be improved by generating multiple signals by distributing a signal from one signal source. Switching a calculation method of a weight vector during a communication mode allows for the reduction in a processing load during communication activities.

Described above is an explanation based on the embodiments of the present invention. These embodiments are intended to be illustrative only and it will be obvious to those skilled in the art that various modifications to constituting elements and processes could be developed and that such modifications are also within the scope of the present invention.

In the embodiment of the present invention, an explanation is given on the premise that two signals are input into the base station apparatus 40 in FIG. 1 or the antenna 42 in FIG. 2. However, the embodiment is not limited to this example. Two or more signals may be input. In this case, the numbers of an antenna 42 and other reception systems need to be provided to the number of input signals.

[Industrial Applicability]

According to the present invention, the accuracy of a calibration process can be improved.

The invention claimed is:

1. A wireless apparatus comprising:
   a mode selector operative to select a communication mode for performing communication with a wireless apparatus to be communicated or a calibration mode for a calibration process;
   a weight vector acquirer operative to acquire a weight vector by executing a first algorithm, which is for a null steering directivity control, on a plurality of reception signals when the calibration mode is being selected by the mode selector and to acquire a weight vector by executing a second algorithm different from the first algorithm when the communication mode is being selected by the mode selector, wherein the plurality of reception signals are generated by a single signal source;
   an outputter operative to output a plurality of transmission signals weighted by the weight vector acquired by the weight vector acquirer; and
   a correction value acquirer operative to acquire a correction value for readjusting the result of the null steering directivity control after the transmission signals are output by the outputter when the calibration mode is being selected by the mode selector, wherein
   the outputter outputs a plurality of transmission signals after correcting the transmission signals by using the correction value acquired by the correction value acquirer when the communication mode is being selected by the mode selector.

2. A measurement system comprising:
   a signal generation apparatus operative to generate a plurality of signals for performing a calibration process;
   a wireless apparatus operative to receive the plurality of signals generated by the signal generation apparatus and output transmission signals by performing the calibration process based on the received signals;
   a measurement apparatus operative to measure the transmission signals output from the wireless apparatus; and
   a control apparatus operative to control the wireless apparatus based on the result of the measurement apparatus, wherein
   the wireless apparatus comprises:
   a mode selector operative to select a communication mode for performing communication with a wireless apparatus to be communicated or a calibration mode for a calibration process;
   a weight vector acquirer operative to acquire a weight vector by executing a first algorithm, which is for a null steering directivity control, on a plurality of calibration-reception signals received from the signal generation apparatus when the calibration mode is being selected by the mode selector and to acquire a weight vector by executing a second algorithm different from the first algorithm when the communication mode is being selected by the mode selector, wherein the plurality of calibration-reception signals are generated by a single signal source;
   an outputter operative to output a plurality of transmission signals weighted by the weight vector acquired by the weight vector acquirer; and
   a correction value acquirer operative to acquire, from the control apparatus, a correction value for readjusting the result of the null steering directivity control after the transmission signals are output by the outputter when the calibration mode is being selected by the mode selector, wherein
   the outputter outputs a plurality of transmission signals after correcting the transmission signals by using the correction value acquired by the correction value acquirer when the communication mode is being selected by the mode selector.

* * * * *